Patented Jan. 21, 1936

2,028,132

UNITED STATES PATENT OFFICE 2,028,132

PROCESS FOR RECOVERING PURE GERMINAL SUBSTANCE FROM SEED KERNELS

Móritz Bienenstock, Budapest, Hungary

No Drawing. Application April 6, 1934, Serial No. 719,406. In Hungary May 11, 1933

6 Claims. (Cl. 209—173)

This invention relates to a process for recovering pure germinal substance from seed kernels, more particularly from seed kernels of the plants of the families of Cæsalpiniaceæ and Mimosaceæ

An object of the invention is to separate the germinal substance of the said seed kernels from other constituents of the comminuted mass resulting on mechanically degerminating the seed kernels.

Another object of this invention is to recover the germinal substance in an undenatured state that is to say without substantially injuring the gluten-forming proteins contained in the said germinal substance so as to obtain a product possessing the property of forming dough.

A further object of this invention is to obtain the germinal substance without dissolving the coloring matter contained in the husks whereby any absorption of the coloring matter of the husks by the germinal matter is avoided.

The seeds of the aforesaid species of plants are encased by a husk which contains coloring matter and the removal of which exposes a more or less hard and thick layer—the endosperm consisting chiefly of hemi-cellulose. This endosperm, which is formed of two lamellæ, encloses a yellow sometimes green, plate, which is the germ portion of the seed kernel. This germinal substance, which is rich in protein, consists of the embryo and its organs, and contains a considerable portion of gluten-forming proteins, which are similar to the gluten-forming proteins of wheat gluten.

Of the constituents of the seeds the endosperms or the extracts made therefrom are employed chiefly for making adhesive, sizing and finishing preparations, and binding agents; they are used in the pharmaceutical industry and in the foodstuffs industry. The germinal substance, which must be separated from the endosperms, has formed until recently an almost worthless waste product, which was brought into commerce only to a limited extent as food for animals.

The applicant and his collaborators have recently proposed a process for the manufacture of foodstuffs rich in proteins in which the germinal substance of the said seeds is utilized. This required that the germinal substance obtained during the degermination of the seeds should be further purified and in particular freed from the husk residues and also, if necessary, from endosperm particles and other impurities.

The working up of the seed kernels is generally carried out by subjecting the entire kernels to a soaking process in the presence of concentrated acids (sulphuric acid or hydrochloric acid) in order to prepare them for the husking process. The husking is usually followed by washing out the acids and drying the kernels. The dried kernels are then deprived of their germs.

The complete removal of the husks during the husking process would per se present no difficulties if in this method the action of the acids were allowed to continue long enough. This is, however, practically impossible because prolonged action of the acids is accompanied by loss of endosperm substance and consequently there is a reduction of the output. One is generally therefore satisfied to obtain, by means of a brief action of the acids, kernels with a very considerable portion of the husk residue, which is separated from the endosperm only on degermination.

As the much tougher and less crumbling endosperms, present a somewhat great resistance during the mechanical degermination, and are obtained either whole or in the form of much larger particles than the more brittle and easily comminuted embryos and the husk residues thus separated from the endosperms, the husk residues on sifting pass almost wholly into the mass of the comminuted germinal substance, while the endosperm portions of the kernels are kept back by the sieve with more or less adherent husk particles but almost free from the separated husk residues. For the same reason the embryos are obtained mixed with husk particles if the unhusked kernels are submitted immediately to degermination. The contamination of the embryos by husk residues amounts to between 5 and 20 per cent according to the special conditions under which working is effected.

In the further purification no interest has up to now been taken. The present method deals with the new requirement that the mixture of germ substance, husk residues, and possibly also small quantities of endosperm substance obtained during degermination should be separated so that the germinal substance is obtained free from the undesirable admixtures. It is based on the known principle of the flotation method which utilizes for the separation of the constituents of a mixture the difference of the specific gravities of the constituents and the consequent difference of buoyancy in a liquid medium the specific gravity of which lies under the working conditions between the specific gravities of the constituents of the mixture to be separated.

The present process consists essentially in the employment, as the medium for the separation of the constituents according to the principle of the flotation method, of organic liquids or liquid mixtures of a suitable specific gravity, which behave indifferently in relation to the gluten-forming proteins of the germinal substance and are preferably such as do not dissolve the coloring matter contained in the husks. Any change in the nature of the gluten-forming proteins which would substantially alter the gluten-developing character of the said proteins i. e. any denaturing of the proteins either through mechanical, chemical or thermal influences must be avoided.

It is known, for the degermination of maize, according to the so-called method of "wet milling", to soak the maize in warm water, and then to crush it and to stir it up with water, whereupon the germs rise to the surface and are skimmed off and dried. For the separation of the germinal substance and husks of the seeds here coming into question, however, water would not be applicable in the present case as a medium since its specific gravity is too low. The specific gravity of the water could indeed be increased by the addition of salts. However, aqueous salt solutions are not applicable in the present case on account of the special character of the germinal substance of the seeds in question. Actually salt solutions would firstly have an unfavorable effect on the glutinous character of the proteins present in the germinal substance, and secondly would reduce the output considerably because the proteins are partly soluble in the salt solutions. Finally, salt solutions would diffuse in the germinal substance and affect the taste unfavorably so that the purified germinal substance would be unsuitable for the human palate.

Apart from the necessary specific gravity, which must lie between the specific gravities of the constituents to be separated, the medium must therefore comply with the requirement that it is indifferent in relation to the gluten-forming proteins of the germinal substance and consequently the gluten-forming proteins must be neither denatured nor dissolved whether as regards separate components, such as gliadin or all gluten-forming proteins, nor injured as regards the particular purposes of application. Further the medium should not dissolve the coloring matter contained in the husks, because otherwise the coloring matter dissolved out of the husks would be taken up by the germinal substance.

As regards the choice of the medium, the fact also comes into consideration that it should have as low a boiling point as possible in order that the portion of the liquid taken up by the germinal substance may be removed therefrom by evaporation or volatilization without danger of denaturing by thermic influences, and recovered if desired. Halogen derivatives of the aliphatic hydrocarbons or mixtures of such derivatives, if desired with an admixture of benzol, benzine, carbon disulphide, etc., so far as these liquids have a specific gravity of about 1.40 at the particular working temperature have been found to be specially suitable media for the separation of the mixtures produced during the degermination of seeds of Ceratonia siliqua.

For carrying out the separation there have been found specially suitable for example mixtures of chloroform, trichlorethylene, tetrachlormethane, pentachlormethane, dichlor-acetic acid or tetrachlor either with suitable quantities of benzol, benzine or carbon disulphide. At normal temperature for example the separation of the mixture can be very well carried out with a mixture of 90 parts by volume of trichlorethylene and 10 parts by volume of benzol or with a mixture of 87 parts by volume of chloroform and 13 parts by volume of benzol.

Also oils and fats may be employed as components of the treating liquid, a reduction of the specific gravity of the medium being effected by these additions.

Temperatures above room temperature can also be used, in which case even pure liquids may be employed. Thus for example the specific gravity of trichlorethylene at ordinary temperature is 1.47 but at a temperature of about 45° C. is only 1.41, so that at about 45° C. the separation may be carried out even with pure trichlorethylene. The use of higher working temperatures has the advantage that by the action of the medium, substances having smell and taste can be removed from the germinal substance to a greater extent than in the case of a treatment at lower temperature, and in addition even such substances that are not removed at all at lower temperatures. When higher working temperatures are employed, however, care must be taken to adjust the temperature and the duration of the treatment so as to avoid denaturing of the gluten-forming proteins liable to affect injuriously the purpose aimed at. Thus, for example, the method according to the invention can be carried out even at temperatures of 70° C. provided care is taken that the period during which the liquid is in contact with the germinal substance is very short—possibly amounts to no more than half a minute.

It is further to be observed that the composition of the liquid, and consequently its specific gravity, is altered when the liquid takes up from the germinal substance oils and fats which may be contained therein. It is therefore advantageous to determine the amount of oils and fats in the germinal substance before the treatment and to select the composition of the separating liquid and the working temperature so that the correct specific gravity can be fixed during the treatment. For this purpose the specific gravity of the liquid is determined during the treatment from time to time and if desired regulated by varying the working temperature or by additions to the liquid. For example, if considerable quantities of oils and fats are dissolved during the treatment at a higher temperature, so that the specific gravity of the medium drops, the working temperature will be reduced in order to restore the required specific gravity. In this case, as soon as the separating liquid has taken up an undesirably large quantity of fat material, the separating liquid, or a portion thereof, is separated by distillation from the fat material and the purified liquid is employed for the treatment of further charges with suitable adjustment of the working temperature.

A specific gravity of 1.40 is suitable for the separating liquid when treating the mixture produced during the degermination of Ceratonia siliqua in the case of a stationary separating liquid. For the purification of the germinal substance of other kinds of seeds the specific gravity is determined in each case by simple preparatory experiments. When the treatment is effected in a current of separating liquid, the specific gravity which will give the germinal substance and the impurities different buoyancies under these conditions must be determined by tests in the manner known per se.

The specific gravity of the germinal substance may be varied within certain limits by a preliminary drying.

After separation has been effected the separating liquid which is adhering to, and which has partly penetrated into, the germinal substance is driven off, preferably by evaporating at the lowest temperature possible, for example in a dry air current or in a vacuum, in order to avoid denaturing also in this operation. The liquid driven off is freed from the dissolved materials and other impurities, and may be returned into the process. During the separation process itself care must be taken that loss of the separating medium by evaporation is avoided as much as possible because the vapor tension of the substance employed is usually rather high at ordinary temperatures. The separation is therefore advantageously effected in closed apparatus.

The method according to the invention may be carried out continuously or discontinuously.

When the husking of the kernels is carried out so carefully that the husks are practically completely removed before the degermination, there is obtained during the degermination a mixture which consists simply of endosperm parts and germinal substance. Also such a mixture may be separated into its constituents according to the method of the present invention in the same way as that hereinbefore described, and there are then obtained on the one hand the endosperm substance and on the other hand the germinal substance in a pure condition.

The germinal substance obtained according to the invention in a pure form may be employed for all purposes for which otherwise the germinal substance or the gluten obtained therefrom is employed—for example in the textile industry, for the production of gluten containing adhesive materials, for obtaining gluten, etc. The pure germinal substance obtained is, however, employed with special advantage in the manufacture of foodstuffs, for example paste goods (macaroni and the like) and baked goods for diabetics.

Examples 1. 10 kg. of unhusked seed kernels of *Ceratonia siliqua* are degerminated in a cross-beater or hammer mill or in some other suitable apparatus for degermination. The mixture obtained is gradually introduced into 50 litres of a mixture 90 per cent by volume of trichlorethylene and 10 per cent by volume of benzol; the germinal substance floats on the surface but the husks and the endosperms carrying husk residues sink to the bottom. The germinal substance is skimmed off the surface, freed from the adhering separating liquid by means of a warm current of air blown through in a suitable apparatus, for example a closed centrifuge, and supplied in the purified condition to the further treatment for any purpose of application.

2. Seed kernels of *Gleditschia triacantos* or of *Cercis siliquastrum* are husked by one of the usual known methods. The husked seed kernels, to which however a portion of the husks still adheres, are now degerminated in an ordinary degerminating apparatus, the husk residues still adhering to the endosperms being mixed with the fragments of germinal substance. The mixture thus obtained contains 5–20 per cent of husk residues, which are removed in the following way: 10 kg. of the germinal substance contaminated with husk residues are added to 30 litres of a mixture of 45 per cent by volume of carbon tetrachloride and 55 per cent by volume of dichlorethylene. The germinal substance rises to the surface of the liquid, whilst the husk residues sink to the bottom. The further treatment of the germinal substance is carried out as in the case of Example 1.

3. Treatment is effected according to Example 1, but instead of a mixture of 90 per cent by volume of trichlorethylene and 10 per cent by volume of benzol, pure trichlorethylene is used as the separating liquid, which for lowering the specific gravity is initially at a temperature of about 45° C. In the course of the continued use of the same separating liquid, notwithstanding the short time during which the liquid is in contact with the germs, more and more oil is dissolved out of the germs. In accordance with the lowering of the specific gravity thus produced, the working temperature is reduced in the course of the process.

As soon as the separating liquid contains more oil than is necessary for the desired reduction of the specific gravity, the saturated separating liquid may be distilled off from the oil and used again as pure separating liquid (pure trichlorethylene).

I claim:

1. A process for recovering the germinal substance from a mixture obtained on mechanically degerminating seed kernels of plants of the class consisting of *Ceratonia siliqua* and related plants of the families of the Cæsalpiniaceæ and Mimosaceæ, which comprises removing the main portion of the endosperm of the said seed kernels from said mixture, introducing the remaining mixture containing the germinal substance and other constituents of the said kernels into a liquid medium which dissolves fatty substances and has a specific gravity lying under working conditions between the specific gravities of the germinal substance and the said other constituents respectively, and which behaves indifferently in relation to the gluten-forming proteins of the said germinal substance, whereby the said remaining mixture separates into two layers, the upper layer of which containing the germinal substance, reducing the temperature of the liquid medium in accordance with the lowering of the specific gravity produced by fatty substances contained in the germinal substance and dissolved out by the liquid medium, so as to restore the required specific gravity, and finally removing separately the two layers from said liquid medium.

2. A process for recovering the germinal substance from a mixture obtained on mechanically degerminating seed kernels of *Ceratonia siliqua*, which comprises removing the main portion of the endosperms of the said seed kernels from said mixture, introducing the remaining mixture containing the germinal substance and other constituents of the said seed kernels, into a liquid medium of a temperature above room temperature, which has a specific gravity lying under working conditions between the specific gravities of the germinal substance and the said other constituents respectively, and which behaves indifferently in relation to the gluten-forming proteins of the said germinal substance, whereby the said remaining mixture separates into two layers, the upper layer of which contains the germinal substance, adjusting the temperature of the liquid medium and the duration of the separating treatment in the said liquid so as to avoid a substantial denaturing of the gluten-forming proteins, and removing separately the two layers from the liquid medium.

3. A process for recovering the germinal substance from a mixture obtained on mechanically degerminating seed kernels of *Ceratonia siliqua*, which comprises removing the main portion of the endosperms of the said seed kernels from said mixture, introducing the remaining mixture containing the germinal substance and other constituents of the said seed kernels, into a liquid medium of a low boiling point, which has a specific gravity lying under working conditions between the specific gravities of the germinal substance and the said other constituents, and which behaves indifferently in relation to the gluten-forming proteins of the said germinal substance, whereby the remaining mixture separates into two layers, the upper layer of which contains the germinal substance, removing the two layers from the liquid medium, and treating the germinal substances in a dry air current so as to evaporate the liquid medium taken up by the germinal substance, while avoiding a substantial denaturing.

4. A process for recovering the germinal substance from a mixture obtained on mechanically degerminating seed kernels of *Ceratonia siliqua*, which comprises removing the main portion of the endosperms of the said seed kernels from said mixture, introducing the remaining mixture containing the germinal substance and other constituents of the said seed kernels, into a liquid medium of a low boiling point, which has a specific gravity lying under working conditions between the specific gravities of the germinal substance and the said other constituents, and which behaves indifferently in relation to the gluten-forming proteins of the said germinal substance, whereby the remaining mixture separates into two layers, the upper layer of which contains the germinal substance, removing the two layers from the liquid medium, and treating the germinal substances in a vacuum, so as to evaporate the liquid medium taken up by the germinal substance, while avoiding a substantial denaturing.

5. A process for recovering the germinal substance from a mixture obtained on mechanically degerminating seed kernels of *Ceratonia siliqua*, which comprises removing the main portion of the endosperms of the said seed kernels from said mixture, introducing the remaining mixture containing the germinal substance and other constituents of the said seed kernels, into pure trichlorethylene at a temperature between 40 and 55° C., whereby the germinal substance floats on the surface of the liquid and the said other constituents sink to the bottom of the liquid, the temperature of the trichlorethylene being reduced in accordance with the lowering of the specific gravity produced by the fatty substances contained in the germinal substance and dissolved out of the same by the trichlorethylene, skimming off the germinal substance, freeing the germinal substance from the adhering liquid, distilling off the trichlorethylene when saturated with fatty substances, and reintroducing it into the process.

6. A process for recovering the germinal substance from a mixture obtained on mechanically degerminating seed kernels of plants of the class consisting of *Ceratonia siliqua* and related plants of the families of the Cæsalpiniaceæ and Mimosaceæ, which comprises removing the main portion of the endosperm of the said seed kernels from said mixture, introducing the remaining mixture containing the germinal substance and other constituents of the said seed kernels, into mixtures of fat solvents which have a specific gravity lying under working conditions between the specific gravities of the germinal substance and the said other constituents respectively, and which behave indifferently in relation to the gluten-forming proteins of the said germinal substance, whereby the said remaining mixture separates into two layers, the upper layer of which contains the germinal substance, and removing separately the said two layers.

MORITZ BIENENSTOCK.